(12) United States Patent
Pitts, Jr. et al.

(10) Patent No.: US 7,578,919 B2
(45) Date of Patent: *Aug. 25, 2009

(54) CAPACITIVE ELECTROSTATIC PROCESS FOR INHIBITING THE FORMATION OF BIOFILM DEPOSITS IN MEMBRANE-SEPARATION SYSTEMS

(76) Inventors: M. Michael Pitts, Jr., 2045 N. Forbes Blvd., Tucson, AZ (US) 85745; Rodrigo F. V. Romo, 2045 N. Forbes Blvd., Tucson, AZ (US) 85745

( * ) Notice: Subject to any disclaimer, the term of this patent is extended or adjusted under 35 U.S.C. 154(b) by 9 days.

This patent is subject to a terminal disclaimer.

(21) Appl. No.: 12/022,042

(22) Filed: Jan. 29, 2008

(65) Prior Publication Data

US 2008/0156633 A1    Jul. 3, 2008

Related U.S. Application Data

(63) Continuation of application No. 10/796,814, filed on Mar. 9, 2004, now abandoned, which is a continuation of application No. 10/047,493, filed on Jan. 14, 2002, now abandoned, which is a continuation-in-part of application No. 09/416,255, filed on Oct. 12, 1999, now abandoned, which is a continuation-in-part of application No. 09/167,115, filed on Oct. 6, 1998, now abandoned, which is a continuation-in-part of application No. 08/779,819, filed on Jan. 6, 1997, now Pat. No. 5,817,224, which is a continuation-in-part of application No. 08/197,154, filed on Feb. 16, 1994, now Pat. No. 5,591,317.

(51) Int. Cl.
    *B03C 5/00*    (2006.01)

(52) U.S. Cl. ...................... 204/571; 204/667

(58) Field of Classification Search ................. 204/164, 204/571, 667; 210/243, 748
See application file for complete search history.

(56) References Cited

U.S. PATENT DOCUMENTS

3,933,606 A    1/1976    Harms .................... 204/152

(Continued)

FOREIGN PATENT DOCUMENTS

DE    198 06 796 A1    2/1998

(Continued)

OTHER PUBLICATIONS

Dictionary.com, "biofilm," in Merriam-Webster's Medical Dictionary. Source location: Merriam-Webster, Inc. http://dictionary.reference.com/browse/biofilm. Accessed: Apr. 3, 2009.*

(Continued)

*Primary Examiner*—Patrick Ryan
*Assistant Examiner*—William T Leader
(74) *Attorney, Agent, or Firm*—Quarles & Brady LLP; Gavin J. Milczarek-Desai

(57) ABSTRACT

A high-voltage capacitive electrostatic device is used to improve the performance of membrane-separation processes, particularly reverse-osmosis units, wherein species of a given ionic polarity are separated from water. The device is immersed in the water flowing across the membranes and is operated continuously at very high voltages, preferably greater than 30,000 volts DC. The charge on the wetted surface of the suspended particles is altered by the electrostatic field so generated and is found to reduce biofilm formation, thereby materially enhancing the performance of the membrane-separation system. The application of high-voltage electrostatic fields is also found to reduce corrosion of metallic surfaces in the system.

3 Claims, 8 Drawing Sheets

U.S. PATENT DOCUMENTS

| | | | | |
|---|---|---|---|---|
| 4,024,047 | A | 5/1977 | Clark et al. | 204/302 |
| 4,238,326 | A | 12/1980 | Wolf | 210/695 |
| 4,278,548 | A | 7/1981 | Bettinger et al. | 210/636 |
| 4,755,305 | A | 7/1988 | Fremont et al. | 210/748 |
| 4,802,991 | A | 2/1989 | Miller | 210/705 |
| 4,886,593 | A | 12/1989 | Gibbs | 204/302 |
| 4,902,390 | A | 2/1990 | Arnesen | 204/149 |
| 4,915,846 | A | 4/1990 | Thomas, Jr. et al. | 210/702 |
| 5,022,419 | A | 6/1991 | Thompson et al. | 134/102 |
| 5,114,576 | A | 5/1992 | Ditzier et al. | 210/195.1 |
| 5,128,043 | A | 7/1992 | Wildermuth | 210/695 |
| 5,326,446 | A | 7/1994 | Binger | 204/305 |
| 5,591,317 | A | 1/1997 | Pitts, Jr. | 204/667 |
| 5,807,439 | A | 9/1998 | Akatsu et al. | 134/32 |
| 5,817,224 | A | 10/1998 | Pitts, Jr. | 204/571 |
| 5,932,027 | A | 8/1999 | Mohindra et al. | 134/21 |
| 6,180,056 | B1 | 1/2001 | McNeel et al. | 422/15 |

FOREIGN PATENT DOCUMENTS

| | | |
|---|---|---|
| JP | 1-245868 | 2/1989 |
| JP | 2-298397 | 10/1990 |
| WO | WO 99/50186 | 10/1999 |

OTHER PUBLICATIONS

A.J. Sale, "Effects of High Electric Fields on Microorganisms," Biochimica et Biophysica ACTA 781-788 (1967).

R.W. Glaser, "Reversible Electrical Breakdown of Lipid Bilayers: Formation and Evolution of Pores," Biochimica et Biophysica ACTA 275-286 (1988).

C.P. Davis, "Effects of Microamperage, Medium, and Bacterial Concentration on Iontophoretic Killing of Bacteria in Fluid," Antimicrobial Agents and Chemotherapy 442-447 (1989).

C.P. Davis, "Bacterial and Fungal Killing by Iontophoresis with Long-Lived Electrodes," Antimicrobial Agents and Chemotherapy 2131-2134 (1991).

S.A. Blenkinsopp, "Electrical Enhancement of Biocide Efficacy Against *Pseudomonas aeruginosa* Biofilms," Applied and Environmental Microbiology 3770-3773 (1992).

C.P. Davis, "Quantification, Qualification, and Microbial Killing Efficiencies of Antimicrobial Chlorine-Based Substances," Antimicrobial Agents and Chemotherapy 2768-2774 (1994).

J. Jass, "The Effect of Electrical Currents and Tobramycin on *Pseudomonas aeruginosa* Biofilms," Journal of Industrial Microbiology 234-242 (1995).

N. Wellman, "Bacterial Biofilms and the Bioelectric Effect," Antimicrobial Agents and Chemotherapy 2012-2014 (1996).

J. Jass, "The Efficacy of Antibiotics Enhanced by Electrical Currents Against *Pseudomonas aeruginosa* Biofilms," Journal of Antimicrobial Chemotherapy 987-1000 (1996).

\* cited by examiner

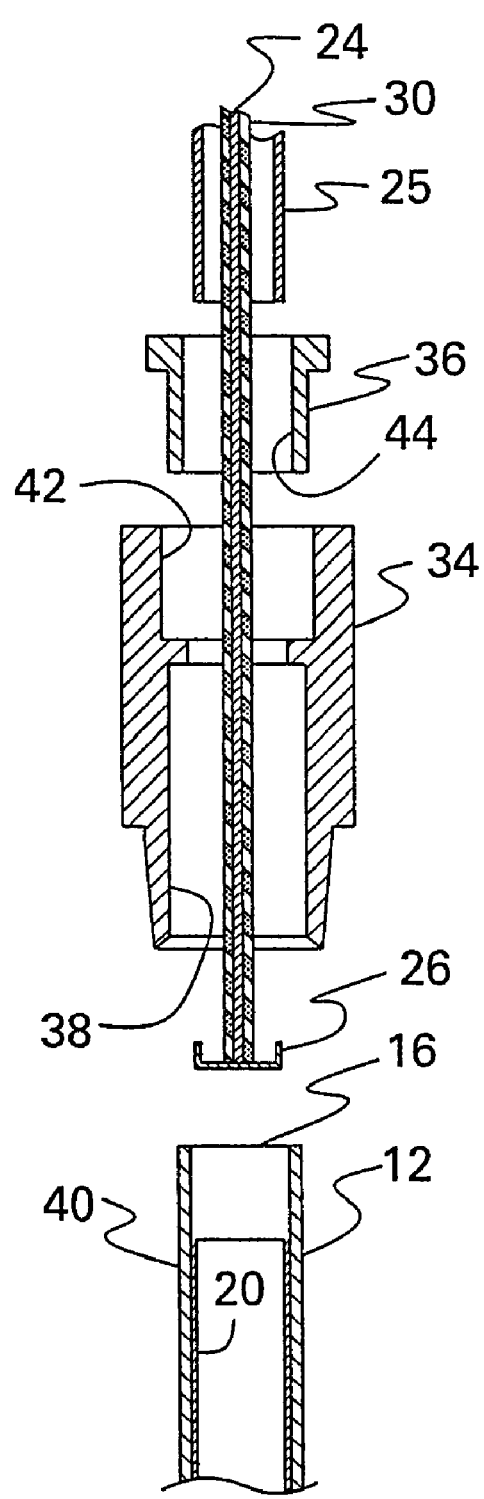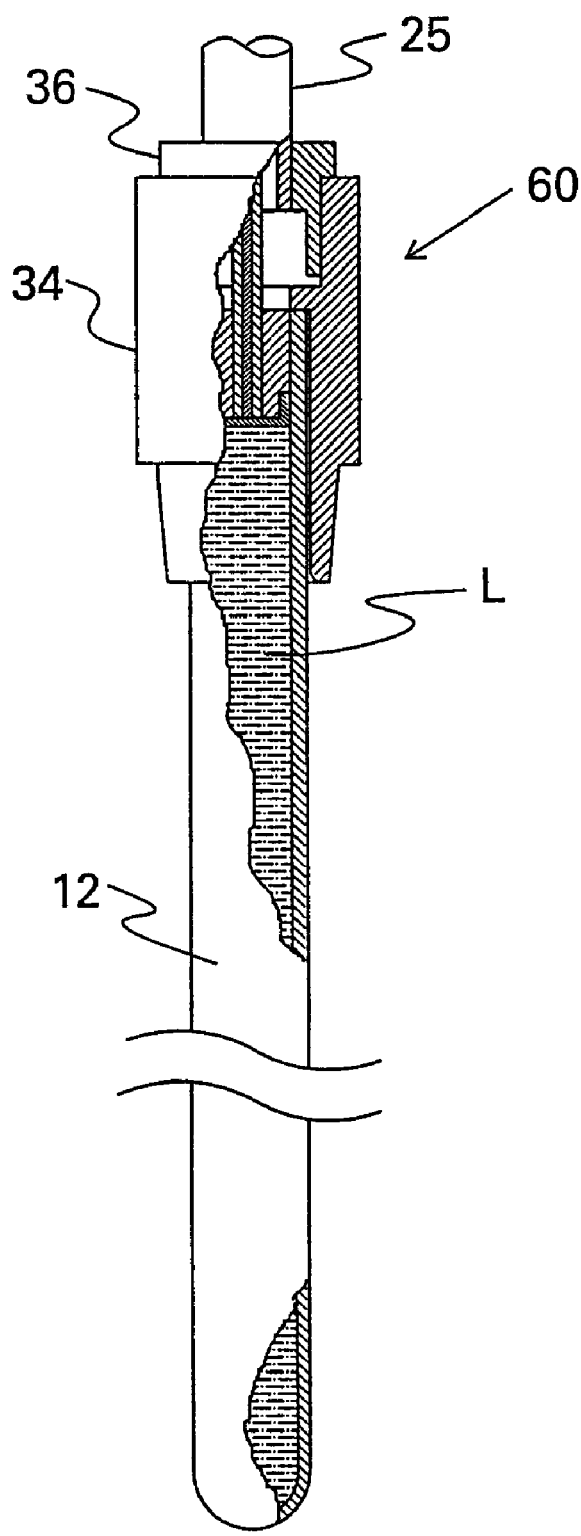
Fig. 4
Fig. 7

CAPACITIVE ELECTROSTATIC PROCESS FOR INHIBITING THE FORMATION OF BIOFILM DEPOSITS IN MEMBRANE-SEPARATION SYSTEMS

CROSS-REFERENCE TO RELATED APPLICATIONS

This application is a continuation application of U.S. Ser. No. 10/796,814, filed Mar. 9, 2004 now abandoned which is a continuation of U.S. Ser. No. 10/047,493 (now abandoned), filed Jan. 14, 2002, which was a CIP application of U.S. Ser. No. 09/416,255, filed Oct. 12, 1999, abandoned, which was a CIP of 09/167,115 filed Oct. 6, 1998 (now abandoned), which was a CIP of Ser. No. 08/779,819 filed Jan. 6, 1997 (now U.S. Pat. No. 5,817,224), which as a CIP of Ser. No. 08/197,154 filed Feb. 16, 1994 (now U.S. Pat. No. 5,591,317).

BACKGROUND OF THE INVENTION

1. Field of the Invention

This invention generally relates to methods for the electrostatic treatment of water streams. In particular, the invention describes a method for preventing the formation of deposits, especially biofilm deposits, on conventional membrane-separation systems by the application of a capacitive electrostatic device.

2. Description of the Related Art

Water treatment systems are commonly subject to reduced efficiency and failure as a result of scaling and clogging by solid particles suspended in the aqueous medium, as well as by the formation of biofilms that adhere to exposed surfaces in the equipment. Corrosion caused by biofilms, biosludge and scale deposits is also a source of equipment failure and maintenance challenges. The concept of treating the water by inducing an electrostatic field across it has been known and many devices have been utilized with varying success, both for industrial and domestic applications, as a means for causing the precipitation and settling out of mineral and organic deposits. To the extent that prior-art system have been successful in facilitating the removal of suspended material, they still have not prevented the formation of mineral and organic deposits, especially biofilms, on filtration membranes and wetted surfaces of water treatment plants.

Capacitive electrostatic fields are created in a body of flowing water by an insulated electrode arranged to produce a capacitive layer across the water. The integrity and strength of the insulation between the water and the electrode is crucial for the continued operation of a system because any breakdown of the dielectric layer causes a current leakage or short through the water body and the inevitable shutdown of the system. Therefore, capacitive electrostatic devices must be constructed such as to ensure the integrity of the dielectric material used to insulate the electrode (which is usually positive for scale-reduction applications). This has been achieved in the art by encasing a tubular metallic electrode in a Teflon® sleeve which is heat shrunk around the outer surface of the electrode, and by sealing each end of the resulting insulated electrode with protective dielectric bushings. A seamless insulating layer of Teflon® around the metallic electrode has thus been used to ensure intimate contact between the two materials. Such intimate contact is very important because any air space left between the metal and the dielectric, such as produced by blisters or bubbles in the dielectric layer, causes electrical arcing that eventually perforates the Teflon® layer, shorts the electrode to the water body, and greatly reduces the electrostatic efficiency of the device. Moreover, a large air space would form yet another dielectric layer within the system, which is undesirable because of the very low capacitance of air which would further reduce the overall capacitance of the system.

Because the capacitive electrostatic field across a water medium is proportional to the potential applied to the system, it is desirable to apply as high a voltage as possible within the tolerances of the apparatus. As I disclosed in U.S. Pat. Nos. 5,817,224 and 5,591,317, higher voltages have been found to be more effective, at times essential, for treating waters with high dissolved or suspended solid concentrations (such as with more than 1,000 ppm total dissolved solids) which have been shown to be totally unaffected by conventional devices and methods that can only operate at less than 10,000 volts. For a given water quality and flow rate, there is a critical field intensity below which no capacitive electrostatic effect is noted.

The devices of the prior art are limited in their application by twofold problems. Because of its well-known physical properties, PTFE material such as Teflon® is not suitable for adherence to the surface of metal conductors other than by heat-shrink processes. Any attempt to cover an electrode with Teflon® by a process other than heat-shrinking, such as would be required for an electrode having a non-cylindrical shape, would necessarily compel the formation of seams and connections which would be very difficult to achieve and prone to breakdown during use. In addition, due to the non-stick properties of the material, it would be very difficult to avoid the formation of air spaces between the metal and the dielectric surfaces. Accordingly, the preferred structure of such electrostatic devices is cylindrical with each end sealed by means of separate dielectric bushings. Under normal stresses of operation, the connection between the tube and these end bushings has been the source of leaks which allow the water medium to come into contact with the high-voltage metallic tube and cause a complete system breakdown.

Another problem relates to the thickness of the dielectric material utilized in the prior art. In order to optimize capacitance, the layer of Teflon® used to coat the positive electrode is kept to a minimum, thereby causing the dielectric layer to be more vulnerable to imperfections of construction which can cause arcing or other operating stresses that could result in interruption of insulation. As a result of these constraints, the devices of the prior art are not suitable for efficient and dependable operation at voltages higher than approximately 10,000 volts, beyond which they quickly experience breakdowns. This characteristic has prevented their utilization for large water-treatment systems and for waters containing high concentrations of dissolved solids, both of which require very high electrostatic potentials applied across the water body in order to process high-volume throughputs.

Because of these practical problems, the concept of applying an electrostatic field to a water suspension to effect its physical characteristics has been exploited only in relatively small water treatment systems having low throughput and/or low solid content, and only in an effort to reduce scaling and remove fine particulate matter. In U.S. Pat. No. 5,591,317, I disclosed a new electrostatic device which is operable at very high voltages with reliability and safety. In particular, I demonstrated that such device is not susceptible to total breakdown as a result of breakage or interruptions in the dielectric integrity of the material. Given the relatively high voltage at which my capacitive electrostatic device can be safely and reliably operated, I have explored its use for improving other processes such as chemical flocculation, disclosed in my application Ser. No. 09/167,115, and now membrane separation, particularly reverse osmosis (RO), which are important processes utilized in the treatment of water for public or industrial use.

The major problem encountered in membrane separation plants (reverse osmosis, nanofiltration, ultrafiltration) is the fouling of membranes caused by mineral, organic and biological deposits. These deposits affect system performance because clean-water recovery and quality necessarily decline as membrane fouling increases. In addition, the bacteria and other microorganisms entrapped on the membrane's surface cause them to become plugged, which in turn requires increased operating pressures and energy consumption, and greater frequency of chemical washing, all of which results in irreversible equipment damage.

Thus, this disclosure is directed to improving conventional membrane-separation processes by the application of capacitive electrostatic fields produced by the high voltages permitted by devices such as disclosed in U.S. Pat. No. 5,591,317. The invention is based on the discovery that such high-voltage induced fields essentially prevent biofouling of membranes and produce greater permeate recoveries than possible in the prior art. A number of prior inventions, such as disclosed in U.S. Pat. Nos. 3,933,606, 4,238,326, 4,755,305, 4,802,991, and 4,915,846, have utilized an electric power source to improve water purification and dewatering processes. Others, such as described in U.S. Pat. Nos. 4,024,047, 4,902,390, and 5,326,446, have used electrostatic and electromagnetic fields to purify waters of biological material and bacterial contaminants by reducing their propagation and causing them to settle out. In particular, U.S. Pat. No. 4,886,593 taught a method for killing or inhibiting the growth of bacteria in water by subjecting the water to an electrostatic field of sufficient intensity to produce that effect, preferably in the presence of a leakage current in the order of several milliamps.

The preference for the presence of a leakage current in the order of milliamps is consistent with historical findings in the art of killing bacteria with electrical phenomena. Since the middle of the last century, the application of electrical currents has been reported to kill bacteria. The bactericidal mechanism was postulated to be the induction of mutations, or by some impact of the charge and subsequent cavitation of the bacterial organisms. In 1967, DC pulses up to 25 kv/cm were tested on bacterial suspensions and found to kill a number of bacteria, but as a result of thermal effects rather than electrolysis. The current density ranged from 8 to 61 amps/cm2. See A. J. Sale, "Effects of High Electric Fields on Microorganisms," Biochimica et Biophysica ACTA 781-788 (1967). In 1988, a method of reversible breakdown of lipid membranes was reported using current densities in the order of 1 amp/cm2 produced by the application of 0.5-1.9 volts. Cell membranes temporarily lost their barrier function by creating hydrophilic pores when exposed to these relatively high electrical potential differences. R. W. Glaser, "Reversible Electrical Breakdown of Lipid Bilayers Formation and Evolution of Pores," Biochimica et Biophysica ACTA 275-286 (1988). In 1989, based on experiments with synthetic urine and iontophoresis carried out using 10-400 micro-amps of current, it was determined that the lethality of the current was directly related to the amperage. C. P. Davis, "Effects of Microamperage, Medium, and Bacterial Concentration on Iontophoretic Killing of Bacteria in Fluid," Antimicrobial Agents and Chemotherapy 442-447 (1989). Follow-up work in 1991 showed that bacterial and fungal killing could be accomplished with iontophoretic technology and improved electrodes using up to 400 micro-amps of current. C. P. Davis, "Bacterial and Fungal Killing by Iontophoresis with Long-Lived Electrodes," Antimicrobial Agents and Chemotherapy 2131-2134 (1991). Using low-intensity electrical fields of 12V/cm2 and low current strengths of 2.1 mA/cm2, Blenkinsopp demonstrated electrical enhancement of biocide efficiency against *P. aeruginosa* in biofilms in 1992. S. A. Blenkinsopp, "Electrical Enhancement of Biocide Efficacy Against *Pseudomonas Aeruginosa* Biofilms." Applied and Environmental Microbiology 3770-3773 (1992). The mechanism was felt to be either electroporation, electrophoresis, or iontophoresis. In 1994, Davis used a 400 micro-amp current to convert chloride ions present in synthetic urine to chlorine-based substances and concluded that this was the basis for the antimicrobial effect of iontophoresis. C. P. Davis, "Quantification, Qualification, and Microbial Killing Efficiencies of Antimicrobial Chlorine-Based Substances," Antimicrobial Agents and Chemotherapy 2768-2774 (1994). In 1995, currents of up to 20 mA/cm2 were used to demonstrate that they had no detrimental effect on biofilms, but confirmed that they enhanced the performance of tobramycin against *P. aeruginosa*. J. Jass, "The Effect of Electrical Currents and Tobramycin on *Pseudomonas Aeruginosa* Biofilms," Journal of Industrial Microbiology 234-242 (1995). In 1996 Wellman reported an independent confirmation of this bioelectric effect with currents of 1-5 mA/cm2. N. Wellman, "Bacterial Biofilms and the Bioelectric Effect," Antimicrobial Agents and Chemotherapy 2012-2014 (1996). Later that year, work with 9 mA/cm2 and antibiotics suggested that an electrical current can enhance the activity against biofilms of those antibiotics that are effective against planktonic cells. J. Jass, "The Efficacy of Antibiotics Enhanced by Electrical Currents Against *Pseudomonas Aeruginosa* Biofilms," Journal of Antimicrobial Chemotherapy 987-1000 (1996).

Thus, after several decades of research with different levels of AC and DC voltages, experiments have shown that bacteria are most effectively eliminated by currents in the milliamp range produced by low DC voltages. No one has anticipated or suggested the use of a very-high-voltage capacitive electrostatic field alone, in the absence of measurable currents, as an effective means for reducing biofilm formation in water systems in general, nor in particular in filtration membranes where such reduction also results in a greater efficiency of permeate production.

All prior attempts at controlling the formation and growth of biofilms in the art of membrane water treatment are based on the use of chemical biocides and chemical dispersants, many of the latter having been used for some time in promoting the suspension of mineral particles. The effect of chemicals on the formation of biofilms, though, has been very limited, both in scope and duration, providing little relief to the pervasive and enduring problem of biofilm formation and related fouling of membrane-separation units.

SUMMARY OF THE INVENTION

The primary object of the invention is a process and apparatus for reducing biofilm formation in water treatment plants, particularly membrane-separation units of such plants.

Another object of the invention is an improved rate of recovery in conventional membrane-separation processes.

Another goal of the invention is a capacitive electrostatic device that permits the application of very high voltages in a membrane-separation process to achieve the aforementioned objectives.

Yet another object of the invention is a capacitive device that utilizes a dielectric material capable of withstanding the very high voltages desirable for water treatment in membrane-separation processes, such that a useful capacitive electrostatic field intensity may be advantageously transferred across a body of flowing water.

Therefore, according to these and other objectives, the present invention consists of utilizing a high-voltage capacitive electrostatic device operated at more than 10,000 volts, preferably at 30,000 and higher voltages, to prevent the formation of biofilms and correspondingly improve the performance of membrane-separation processes. The device is used in connection with conventional membrane-separation processes, particularly reverse-osmosis units, wherein species of a given ionic polarity are separated from water. The device is immersed in the water flowing across the membranes and is operated continuously at very high voltages, preferably greater than 30,000 volts DC. The charge on the wetted surface of the suspended particles is altered by the electrostatic field so generated and is found to prevent biofilm formation, thereby materially enhancing the performance of the membrane-separation system. The application of high-voltage capacitive electrostatic fields is also found to reduce corrosion of metallic surfaces in the system. The preferred embodiment of a capacitive electrostatic device for the invention is a vitrified ceramic tube of unibody construction having a single open end adapted to receive a high-voltage power cable through an insulated cap. The interior surface of the ceramic tube is lined with a layer of conductive material electrically connected to the power cable, thereby providing a relatively-large conductive surface in intimate contact with the dielectric surface of the ceramic tube.

Various other purposes and advantages of the invention will become clear from description provided in the specification which follows and from the novel features particularly pointed out in the appended claims. Therefore, to the accomplishment of the objects described above, this invention comprises the features hereinafter illustrated in the drawings as fully described in the detailed description of the preferred embodiment and as particularly recited in the claims. However, such drawings and description disclose only some of the various ways in which the invention may be practiced.

BRIEF DESCRIPTION OF THE DRAWINGS

FIG. 4 is an exploded view of the open-end portion of the device shown in FIG. 3.

FIG. 7 is a schematic view of an alternate embodiment of the device wherein the metallic conductive layer is replaced with a conductive liquid solution.

DESCRIPTION OF THE PREFERRED EMBODIMENTS

Figure 1:
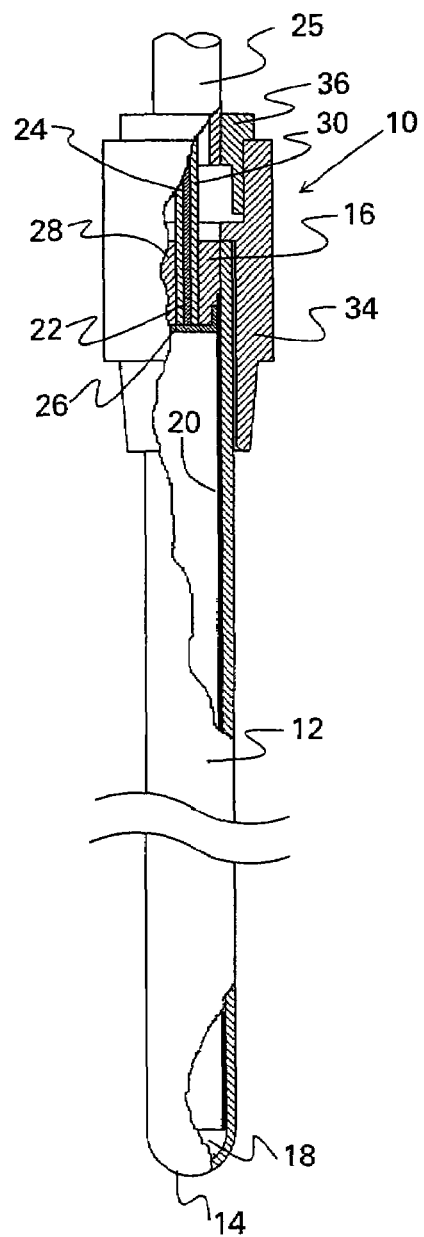
FIG. 1 is an elevational view partially cut-out of a capacitive electrostatic device used in membrane separation processes according to the present invention.

The development of the high-voltage capacitive electrostatic device disclosed herein and in U.S. Pat. No. 5,591,317 provided a basis for addressing many of the problems heretofore unsolved in liquid-separation treatment plants. My copending U.S. Ser. No. 09/167,115 discloses the use of a high-voltage device to improve flocculation processes. Because of the relatively-low voltage limitations associated with prior-art capacitors, it has not been possible before to investigate the effects of the application of high-voltage capacitive electrostatic devices to commercial membrane-filtration systems, especially nanofiltration, ultrafiltration and reverse-osmosis systems. This disclosure is based on the discovery that capacitive electrostatic fields produced by very high voltages in a body of water flowing through such a system yield remarkable results in the prevention of biofilm accumulation in the system's membranes and correspondingly in their permeate recovery.

As those skilled in the art would readily recognize, a true capacitive electrostatic device consists of two electrically conductive plates or equivalent structures separated by a dielectric material (i.e., a material that is non-conductive of direct current). Once the plates of the capacitor are fully charged as a result of the application of a DC voltage, the capacitor takes the characteristics of an open circuit; that is, an electrostatic field is produced across the plates. No measurable current flow is possible across the dielectric material unless the applied voltage is sufficiently high to exceed the dielectric strength of the material. For the purposes of this disclosure, a "measurable" current leak is defined as a current that can be measured with conventional amp-meter instrumentation; that is, a current in the order of milliamps, or at least 100 micro-amps. Given the very high voltages used for the present invention (preferably 30,000 volts and higher), any such measurable leakage current would be expected to rapidly cause a total dielectric breakdown and a corresponding disabling short of the capacitor. Therefore, all references to capacitive electrostatic devices in this disclosure are intended to refer only to capacitors exhibiting no measurable leakage current, as defined herein, during operation. To ensure that end, the power supplies used to energize the capacitive electrostatic device of the invention were provided with a current-limiting ground fault for interrupting the operation of the power supply in case a current to ground of a few micro-amps was detected. Thus, if a measurable current leak had developed in the dielectric material, the device would automatically have been taken out of service.

As also detailed in Ser. No. 09/167,115 with reference to a flocculation process, the capacitive electrostatic-field generator used as the preferred embodiment of this invention includes an outer tube made of vitrified ceramic material as the supporting structure of the electrostatic device, rather than an insulated inner metal tube with a dielectric layer of thin and relatively weak material wrapped around the tube, as previously taught in the art. The ceramic material is much stronger than Teflon® and functions both as the insulating and bearing structure of the device, thus allowing the application of much higher voltages to the electrode. Because of its method of manufacture, a vitrified ceramic tube can be formed in unibody construction with a sealed end, thereby eliminating the need for a sealed, dielectric cap at that end.

Figure 2:
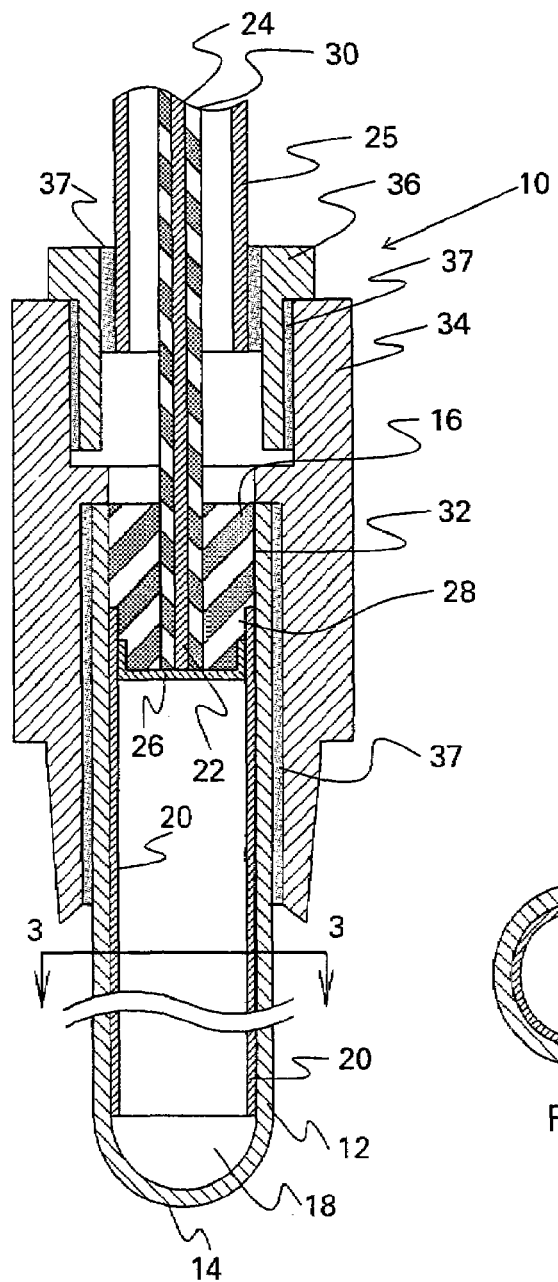
FIG. 2 is a detailed, elevational section of the device shown in FIG. 1.
Figure 3:
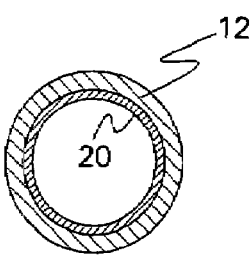
FIG. 3 is a plan view in section of the device as seen along line 3-3 of FIG. 2.

Referring to the drawings, wherein like parts are designated throughout with like numerals and symbols, FIG. 1 illustrates in elevational schematic view the various components of an electrostatic device 10 used advantageously according to the invention to inhibit biofilm deposits in a membrane-separation process. As also shown in more detail in FIGS. 2 and 3, the device 10 consists of a ceramic tube 12 preferably of unibody construction and having a distal integrally-sealed end 14 and a proximal open end 16. The interior surface 18 of the tube 12 is lined with a layer of conductive material 20, such as aluminum or copper foil, disposed in intimate contact with the surface 18 in order to minimize the presence of gaps or air spaces therebetween. Depending on the material and process used to coat the interior of the ceramic tube, the inside of the sealed end 14 may or may not also be lined. In the drawings, the inside of the sealed end 14 is not lined. The capacitive effect of the tube is related to the overall surface of the conductive material 20, as one skilled in the art would recognize.

The end 22 of an appropriately insulated high-voltage cable 24 contained in protective conduit 25 is electrically connected to the conductive material 20 inside the tube 12. A conductive bushing 26, attached to the end 22 of the cable and press-fitted or otherwise connected to the conductive material 20, may be used to provide electrical contact between the two, but any equivalent method or device, such as by welding, would be suitable to practice the invention. This electrical connection is shown near the open end 16 of the ceramic tube in the figures, but it could be effected at any place along the inner length of the tube with equivalent results inasmuch as the entire surface of the conductive material 20 is obviously energized by the connection. Most importantly, though, the open end 16 must be sealed by nonconductive, preferably resilient, adhesive material 28 such as silicone, latex, or rubber which is tightly packed or molded, such as by potting, between the insulating sheath 30 of the cable and an interior wall of the open end 16. Preferably, an outermost annular portion 32 of the interior wall of the open end 16 is not covered with the conductive material 20, so as to provide a continuous dielectric barrier at that end formed by the nonconductive material 28 filling the space between the cable sheath 30 and the ceramic tube 12.

Finally, as shown particularly in FIG. 4, the open end 16 of the ceramic tube 12 is hermetically capped by a mounting fixture 34 adapted for tight water-proof fit with the end 16 on one side and with a cable connector 36 on the other side. The specific shape and characteristics of the fixture 34 and connector 36 are not important for the invention so long as they are adapted to protect the open end 16 of the ceramic tube from penetration of liquid from the outer body of water in which the device is immersed during use. Thus, the gap between the female surface 38 of the fixture 34 and the male surface 40 of the tube 12 fitted thereto, whether by screwable or other type of engagement, must be perfectly sealed for long-term operation of the device. The same is true for the gap between the female surface 42 of the fixture 34 and the male surface 44 of the connector 36. Silicone or other insoluble, preferably resilient, sealing material 37 may be used to ensure water-tight coupling while making the various connections.

Figure 5:
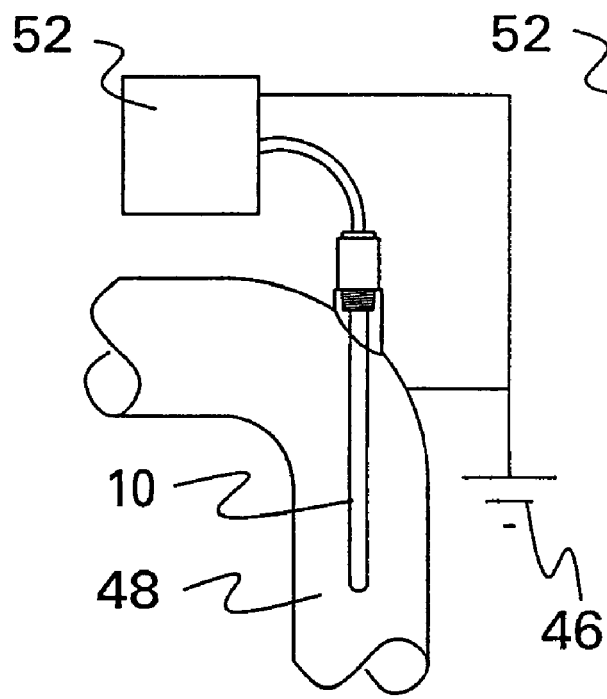
FIG. 5 is a schematic view of the device of FIGS. 1-4 in use in a pipe-elbow arrangement of a large scale water-treatment system, such as a pipe-elbow upstream of a membrane used in the system.
Figure 6:
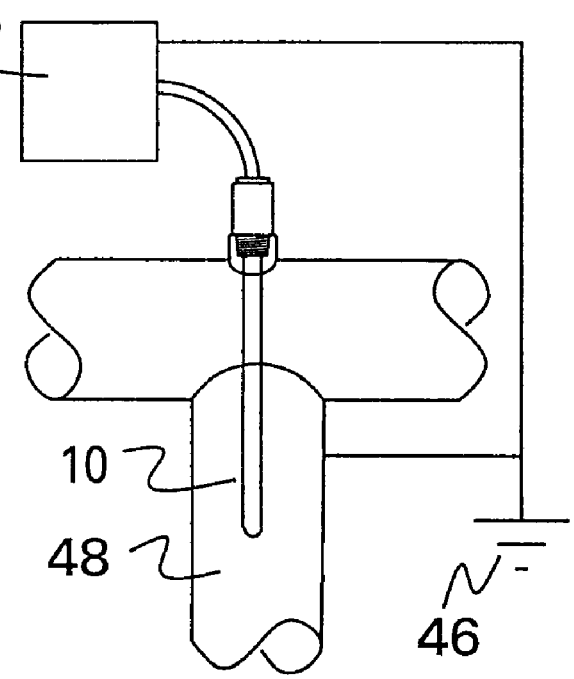
FIG. 6 is a schematic view of the device of the invention in use in a pipe-tee arrangement of a large scale water-treatment system, such as upstream of a membrane separation process.

As described, the outer ceramic tube 12 and the inner lining of conductive material 20 connected to a high-voltage positive power source provide a sound alternative to the electrostatic field generators of the prior art. As illustrated schematically in FIGS. 5 and 6, in operation the device 10 is immersed in a body of water which is connected to a ground 46 either directly or through an electrode immersed in the water at a distance from the device. Such grounded electrode may consist of piping 48, as seen in FIGS. 5 and 6, or a pump or other metallic equipment (not shown). Depending on the water throughput and particulate and/or solute content, the distance between the device 10 of the invention and the grounded electrode is adjusted to provide the electrical field required to cause the intended capacitive electrostatic effect on the particles dispersed and/or the ions dissolved in the water. The apparatus of the invention was tested and found to be very effective at a distance of approximately 2-3 inches, but theoretical calculations based on prior-art knowledge show that it could be operated successfully at distances in excess of 10 feet in waters with up to 3,000 ppm of total dissolved solids. When the conductive material 20 is energized from a power source 52 with a high positive voltage, the dielectric properties of the ceramic tube 12 insulate it from ground, creating an electrostatic field across the tube and the water body. As desired, because of the difference between the dielectric constant of the ceramic and that of the water, the majority of the electrostatic field affects the water body. The configuration of the device 10 allows operation at very high voltages. The device 10 has been operated successfully for long periods of time at up to 50,000 volts DC without failure and can be designed for much higher voltages, if necessary, which in turn makes it possible to effectively utilize the device in large-scale applications.

Another important inventive part of the device 10 is the idea of assembling the conductor/dielectric layer combination in such a way that the weaker link is not in contact with the water being treated. In the devices of the prior art, a structurally weaker Teflon® layer separates the water from a stronger metallic tube. In case of any failure of the dielectric layer, the high-voltage tube becomes immediately shorted and the system breaks down. In particular, this may be caused even by pin-sized gaps between the surfaces of the tube and the Teflon® heat-shrunk around it. When subjected to an electrostatic field, arcing occurs across these gaps causing hot spots which eventually perforate the thin dielectric layer and completely disable the system. Since the severity of arcing is a function of the potential applied to the system, this problem severely limits the DC voltage at which the prior-art apparatus may be operated.

The device of the invention, on the other hand, provides a weaker metallic lining inside a stronger ceramic tube. If the lining is damaged, such as by arcing resulting from air gaps, discontinuities are created in the conductive material, rather than in the dielectric layer, and the high-voltage portion of the device remains insulated from the surrounding water. Therefore, other than by having a negligible effect on the capacitance of the system, these kinds of problems do not affect the continued viability and operation of the electrostatic device. Accordingly, very high DC voltages do not constitute a potential source of total breakdown, as in the case of prior-art apparatus.

The use of vitrified high-alumina ceramics, typically greater than 99.5 percent $Al_2O_3$, or any of a number of other formulations such as a vitrified mullite, also a porcelain, containing less alumina and more silica, is recommended for the present application. Note that ceramics having as low as 50 percent alumina can be used to practice the invention, but their mechanical as well as electrical properties are much less desirable for high-voltage applications. These ceramics have great physical strength, high abrasion and corrosion resistance, and may be assembled at relatively low cost, which all contribute to their diversity and flexibility of application.

Thus, a strong and efficient electrode for this invention can be built by using a ceramic tube that has been cast and fired with one end closed. The high-alumina class of ceramics used is impervious to fluids and possesses the required structural strength for use as a bearing member. The conductor, as opposed to prior-art systems, is not a bearing structure but serves only to distribute the unipolar charge. Accordingly, it may consist simply of a thin layer of material bonded to the inner surface of the tube. Because there is no structural role for the conductor, materials may be chosen to suit the operating environment or to obtain low cost or ease of construction. The conductor may be a thin layer of metal foil, such as copper or aluminum, bonded to the inner wall of the tube with a conductive adhesive, or it may be a conductive adhesive alone, such as an epoxy or acrylic, containing silver or nickel. Alternatively, the conductive layer may be pressed onto the inner surface of the ceramic tube, or sprayed by plasma metallization, or it may be applied as a conductive ceramic glaze or electroplated over such a glaze coating. Since there is no requirement for transmission of high levels of current, the conductor can be a very thin or even a relatively inefficient conductor. A conductive liquid, such as a concentrated solution L of copper sulfate completely filling the cavity within the ceramic tube (illustrated in the embodiment 60 of FIG. 7), or a solid metallic core, would also provide a suitable conductor. The principal requirement is that the contact between the conductive layer and the dielectric material be as perfect and gap-free as possible to avoid void spaces with a low dielectric coefficient that would reduce the overall efficiency of the capacitor system.

In addition to the process for controlling scale and sludge deposits disclosed in U.S. Pat. No. 5,591,317 and the improved flocculation process described in U.S. Pat. No. 5,817,224, I have discovered a method whereby the efficiency of membrane separation processes, such as RO, ultrafiltration and nanofiltration membranes, can be improved over a broad range of operating conditions by inhibiting the formation of biofilm deposits. In particular, I discovered that high-potential capacitive electrostatic fields produce a sharp increase in the surface charge of wetted surfaces and a reduction of the surface tension of the bulk solution being treated with a membrane system. In addition to the known dispersive effects on charged particles, I have discovered that these phenomena also disrupt the ability of biofilms to form and cause existing biofilms to dissolve, thereby greatly improving the performance and maintenance requirements of membrane-separation systems.

Figure 8:
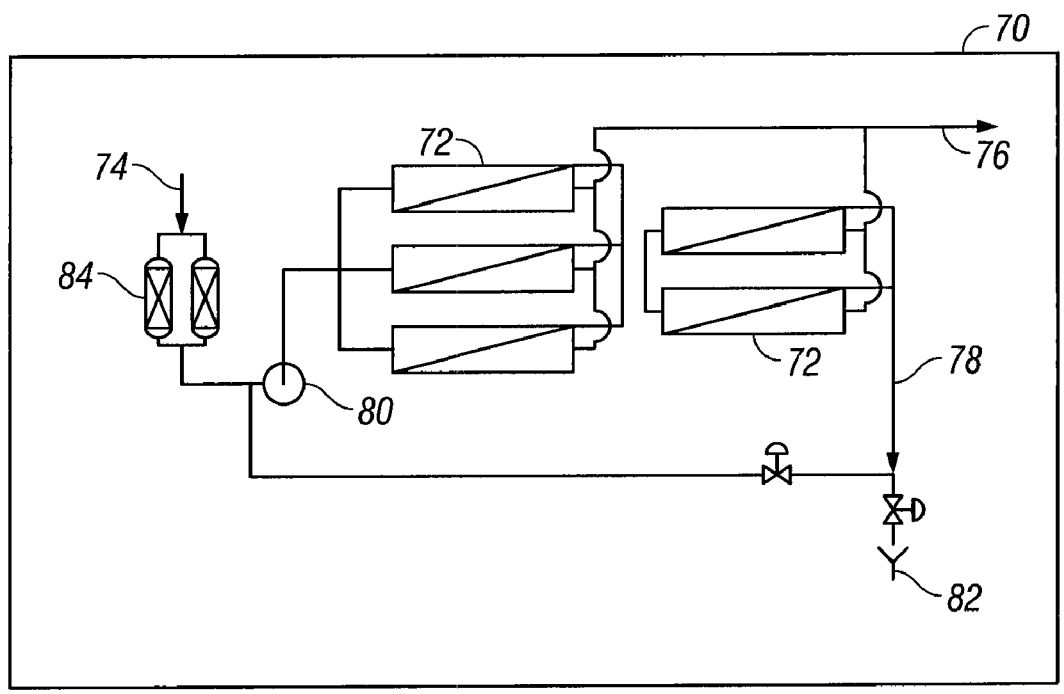
FIG. 8 is a schematic flow diagram of a prior-art RO separation process.

A typical RO system 70, shown schematically in FIG. 8, consists of serial sets of parallel membrane units 72 through which a solution stream 74 is passed to produce a relatively pure permeate stream 76 and a concentrate effluent 78. A portion of the concentrate stream 78 can be recycled by introducing it into the suction side of a high-pressure pump 80 used to feed the system; another portion of the concentrate is discharged through a drain 82. Given the very high concentration of total dissolved solids in the concentrate stream, though, no portion of concentrate is normally recycled. Typical concentrate streams consist of clear, very high total-dissolved-solids (TDS) solutions, from which solids are separated with great difficulty using conventional separation techniques, such as flocculation. As a result, it is most economical to discard the entire concentrate stream. Conventional RO systems experience about 75% recovery, so that about 25% of the feed is discarded as concentrate in the drain 82. Filters 84, or other appropriate pretreatment equipment, may be used to pretreat the feed solution 74 prior to processing it in the RO vessels 72.

In addition to the relatively poor recovery caused by the necessary waste of a portion of the feed as a concentrate stream, RO performance is also reduced by fouling of membranes, which increases energy consumptions and often prevents attainment of product-stream standards. Therefore, membrane fouling represents a major operating limit and economic restriction to membrane separation systems. As mentioned above, membrane degradation may result from a variety of causes, such as crystalline fouling from mineral deposition due to high concentrations in the feed stream; particle fouling from the deposition of clay, silt, particulate humic substances, debris and silica; and colloidal and microbiological fouling, or biofouling, from the adhesion and accumulation of microorganisms that form biofilms.

Several approaches have been used in the past for reducing or preventing membrane fouling, mostly involving pretreatment of the feed stream in complex equipment such as prefiltration units and water softeners. Some processes include the addition of dispersants and/or biocides to the feed stream to reduce biofilm formation. These techniques require periodic chemical and/or mechanical cleaning of the membrane filtration equipment, which involves shutting down each unit. Therefore, these fouling-prevention approaches inherently require equipment downtime, are labor intensive, and, because of membrane incompatibility with the chemicals used for cleaning, can also reduce membrane efficiency and lifetime. Most importantly, though, they are not effective as long-term solutions.

Mineral and biological colloidal particles, found in all untreated water sources, produce most fouling of membranes. Generally any particle with a radius smaller than 1.0 mm is considered to be a colloidal particle. Biological colloids include microorganisms, viruses, fibrils, humus colloids, and aggregates of exudates and macromolecular organic matter. This wide spectrum of materials, along with biological growth, has made biofouling control by chemical addition a difficult task because of the tolerance of different organisms to specific chemicals produced by the protective effect of biofilms and also because of the potential damage inflicted to the membranes by chemical biocides, caustics, acids, and solvent cleaning agents.

It is now understood that, in order for biofouling to occur, there has to be an initial adhesion of microorganisms and colloidal particles to the surface of a membrane. This primary adhesion step consists of a heterogeneous process resulting from the interaction of three distinct phases (liquid, solid and semi-solid phases) and many variables associated with them. The semi-solid phase consists of microorganisms and is affected by variables such as species composition, ambient microflora, nutrient status, hydrophobicity, surface charge, and the presence of extracellular polymeric substances. The liquid phase consists of the fluid being filtered and is affected by variables such as temperature, pH, dissolved organic and inorganic substances, viscosity, surface tension, and hydrodynamic parameters. The solid phase consists of the RO membrane surface, which influences adhesion through chemical composition, surface charge, biological affinity, and the nature of the conditioning film on the membrane, if any.

Bacteria are known to secrete a polysaccharide substance that forms a film that promotes the formation of colonies and their adherence to supporting surfaces. This biofilm material, commonly referred to as consisting of extracellular polymeric substances (EPS), mostly polysaccharides, protects the bacteria from chemical and physical agents present in the water stream while permitting the exchange of bacterial nutrients and wastes with the surrounding environment. Such biofilms are very highly hydrated, containing at least 95 wt % water with the rest being bacterial and residue matter. This bacterial biofilm consists of a sticky, mucous-like substance that adheres to stationary surfaces and entraps foreign material that becomes exposed to it. Accordingly, biofilm deposits are known to collect cations such as copper, magnesium, manganese, and iron, which can produce a galvanic-cell effect and promote corrosion of metallic surfaces. Biofilm deposits of modest thickness are also known to be anaerobic at the point of contact with a wall. In anaerobic conditions, some bacteria reduce oxygen-bearing compounds to obtain metabolic oxygen and produce hydrogen sulfide as a by-product. This in turn combines with other products in the water to form local concentrations of acids that further increase the corrosiveness of the biofilm. Other bacteria are capable of extracting their metabolic requirement of carbon directly from steel, thereby also causing severe corrosion. Therefore, removal of biofilms is also important for the prevention of corrosion to filtration membranes, piping, and equipment.

The surface charge of the microorganisms and colloidal particles in the feed stream is very likely to influence the primary stage of microbial adhesion. Since most bacteria are slightly negatively charged in aqueous systems, their initial adhesion to a membrane has been found to be influenced by electrolyte concentration, that is, by the charge distribution around the bacteria. Therefore, this property is believed to afford an opportunity for controlling biofouling of membranes. By preventing bacteria and mineral deposits from forming or adhering onto the surface of a membrane, the initial stage necessary for biofouling to take place would be eliminated. Thus, it is expected that biofouling would be greatly reduced.

The fact that many organic and mineral colloidal particles possess a negative charge in aqueous environments causes them to repel one another and maintain the stable state of dispersion that characterizes them. Electrochemical dispersion of colloidal particles has been studied for many years. Several models, such as the double-layer and the DLVO theories, have been developed to explain the stability of colloids. The double-layer model predicts that when suspended particles exist in a liquid phase an inner, dense layer at the surface of each particle, consisting of ions in solution attracted by the charge of the particle, exhibits a charge of polarity opposite to the natural charge of the particle itself under the physical and chemical conditions of the suspension. An outer layer of opposite polarity, also consisting of ions in solution, is diffused within a given distance from the surface of the particle. The net potential between the two layers, normally referred to in the art as the zeta potential, produces a repulsion which counteracts van der Waals forces of attraction between the particles. If the outer layer is diffused over a sufficiently wide radius, thereby increasing the effect of the zeta potential, the particles are kept apart and will remain in stable suspension. If, on the other hand, the radius of diffusion of the outer layer is reduced to the point where the van der Waals forces prevail, the particles are attracted to form agglomerates which tend to separate from the liquid phase.

The present invention is based on the idea of affecting the surface charge of the particles present in the feed stream of an RO unit, especially colloidal biological particles, in order to disperse them by applying a very strong capacitive electrostatic field. Dispersion of colloids has already been suggested as a means for maintaining RO membranes free of colloidal fouling. However, every attempt made so far to increase the surface charge of colloids and membranes has been through the use of chemical dispersants and has produced limited effects. As illustrated schematically in the RO system 90 of FIG. 9, the present invention is practiced by coupling a capacitive electrostatic generator 10, as detailed above with reference to FIGS. 5 and 6, to the feed stream to the reverse-osmosis units 72 of a conventional treatment plant. The capacitive electrostatic generator is believed to function by inducing an alteration of the natural outer-layer charge density of the suspended particles irrespective of composition, or an alteration of the charge density about the ions in solution. Specifically, the zeta potential is increased by the application of a high-voltage capacitive electrostatic field. The conductive material 20 of the electrostatic generator 10 and the grounded pipe wall form a capacitor inducing an electric field across the water flowing by that is a function of the applied electromotive force, the system dimensions, and the dielectric properties of the ceramic tube 12 and the water solution. At sufficiently high DC voltages, the capacitive charge produces a field across the water that influences the surface charge of all wetted surfaces, both fixed and suspended. In practice, I found that a DC voltage of at least approximately 10,000 volts, but preferably greater than 30,000 volts, is required for affecting RO performance in industrial applications. More than one electrostatic capacitor can also be used, as may be necessary to maintain a high electrostatic field across the body of flowing water. Multiple batteries including up to 12 electrodes have been tested with very good success in large plants.

Figure 9:
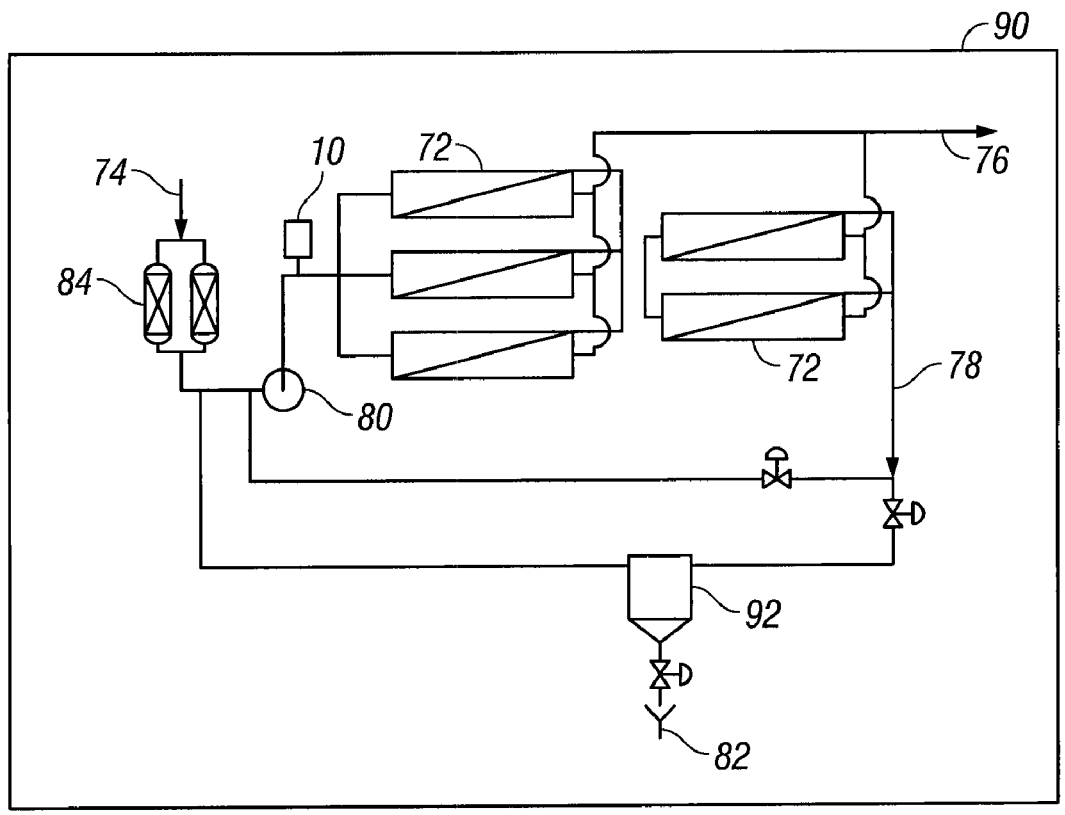
FIG. 9 is the RO separation process FIG. 8 modified to include a high-voltage electrostatic capacitor according to the invention.

The general scheme of FIG. 9 was implemented to investigate the concept of the invention. In addition, a clarifier/flocculation system 92 was added to the concentrate recirculation circuit to further enhance recovery by allowing recycling of substantially all concentrate effluent from the RO units. I found that application of a high-voltage-induced electrostatic field to the RO system produced a concentrate that was very rich in colloidal matter that could be easily separated to clarify the water, as already also demonstrated in U.S. Pat. No. 5,817,224. Thus, after successful separation of the solids in the unit 92, all liquid effluent could be advantageously recirculated to the intake side of the pump 80, leaving only a sludge to be discarded to the drain 82.

The process and device of the invention were tested in various membrane-separation units in industrial environments, as described in the following examples.

EXAMPLE 1

An 18-inch ceramic electrode configured according to the device 10 and a 30 kV DC power supply were installed in the pump suction of a reverse osmosis unit at a soft drink bottling plant. The object of the installation was to study the effect of the high-voltage capacitive electrostatic field created by the device 10 on RO membranes as a means for maintaining the membranes free of biological deposits. The reverse osmosis unit in the test was an Osmonics Model OSMO 43CHF-PR216KY/DLX, having a permeate rate at 25° C. of about 450 liters per minute and a concentrate rate of about 135 liters per minute, with primary and final maximum and minimum pressures of 400 psi and 250 psi, respectively. The Osmonics unit consisted of a 3-2 series array configuration (as illustrated in FIG. 9) with each vessel housing five Filmtec membranes Model Number BW30-330. Feed water was taken from city water with about 300 ppm in total dissolved solids. Pretreatment for the water involved sand filtration, carbon filtration and sodium softening. Prior to installation of the device 10, the RO unit had been cleaned and thereafter operated for about two months, Monday through Thursday, each week, for approximately 20 hours per day of operation. Data were collected daily for approximately one year as part of normal quality-control procedures for the facility. A total of 198 data were collected; 93 taken prior to and 104 taken after the start of the treatment program. For performance evaluation, the raw data were standardized to 25° C. utilizing a normalization program of conventional design.

The test was performed by energizing the electrostatic capacitor at about 30,000 volts DC and maintaining the resulting electrostatic field approximately constant for the entire duration of the test (over three months). The absence of any leakage current was ensured by a ground fault in the power supply designed to shut it off if a current of at least 14 iamps was detected.

Figure 10:
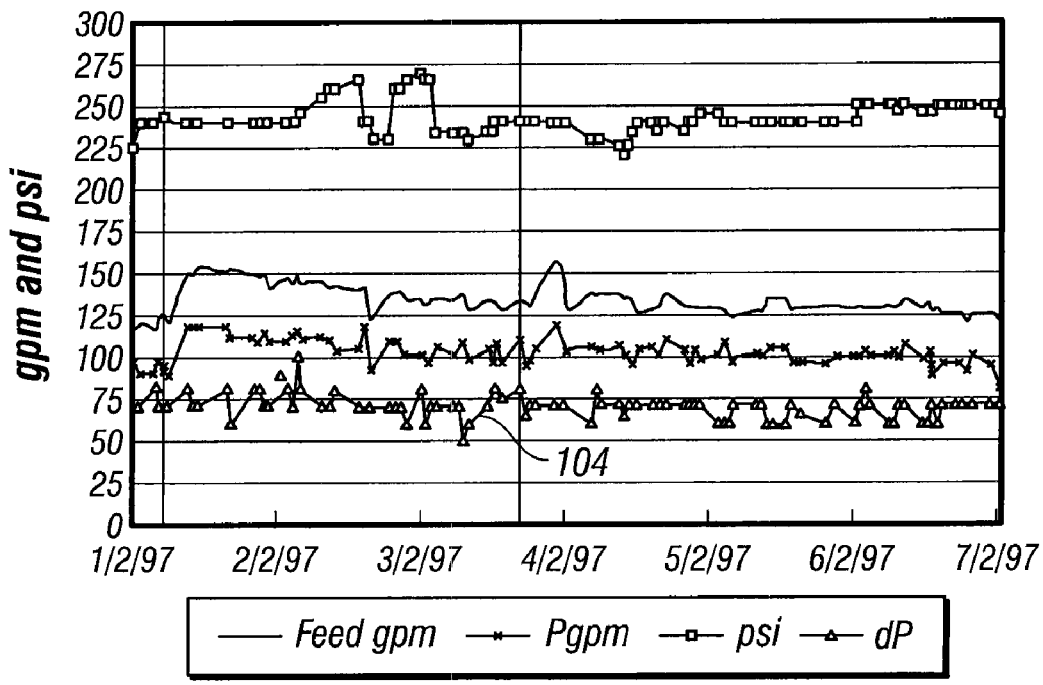
FIG. 10 is a time plot of feed rate, feed pressure, permeate rate, and transmembrane pressure drop of an RO unit used for the experimental run detailed in Example 1.
Figure 11:
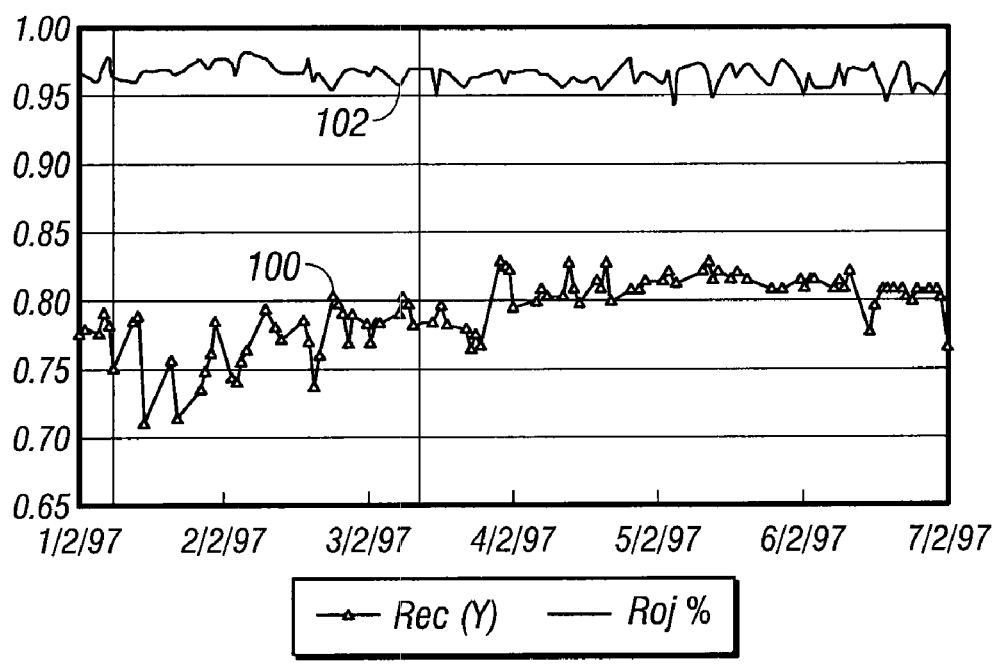
FIG. 11 is a time plot of the recovery rate and salt rejection rate of the RO unit used for the experimental run detailed in Example 1.

The results showed a significant increase in the rate of permeate recovery, as shown in the plots of FIGS. 10 and 11. The recovery rate, which is defined as the amount of water produced as permeate as a percentage of feed water to the system, averaged 77.26% prior to the test period (curve 100 in FIG. 11); the salt rejection rate averaged 97.50% (curve 102 in FIG. 11); and the transmembrane pressure drop averaged 490 kPa (curve 104 in FIG. 10). After installation of the device 10, the values for those same parameters averaged 79.50%, 97.00%, and 474 kPa, respectively, thus showing an increase in the recovery rate of roughly 3% as a result of increased membrane performance (without concentrate recycling).

Prior to the test, the membranes in the facility had required routine cleaning every three to four months, often showing a heavy film of slime covering both the membranes and the interior walls of the vessels. At the end of the testing period, one of the vessels was opened for a visual inspection and no sign of biological deposit was found on its walls; similarly, the membrane body, like the vessel surface, was also found to be free of biofilm, corrosion and scaling. Two months after the initial test period was concluded, the membranes were cleaned as a preventive maintenance measure even though performance had not dropped. As expected, the performance of the membranes was not enhanced by the cleaning cycle, demonstrating that the membranes had remained clean throughout the full treatment period and thereafter. This was not like previous cleaning experiences, after which performance had increased remarkedly following a steady decline prior to the cleaning cycle. The treatment was then resumed and continued indefinitely with no evidence of biofouling.

EXAMPLE 2

The capacitive electrostatic device of the invention was utilized to determine whether improvements could be obtained in a system for producing high purity water in a microelectronics plant that included two independent RO units in series. The system used an initial 2-1-1 array configuration, wherein the permeate of the first unit became the feed to a second unit having a 2-1 array, both units being equipped with Hydranautics Model 8040-LHY-CPA2 membranes. Prior to use of the electrostatic device, maintenance personnel cleaned the membranes approximately every two to three weeks. The membranes were cleaned again at the time of installation of the electrostatic device. As a part of normal feed pretreatment, a chemical dispersant was being added to the feed stream of the first RO unit. This dispersant feed was reduced by 50% after the test began.

Three weeks after the test started at about 35,000 volts DC, one vessel from each unit was opened for inspection. When the membrane was removed, in contrast to past inspections, no deposits were found on any of the wetted surfaces. Previously, it had been common to find a thick layer of slime throughout the assembly. The system showed a reversal of performance deterioration and an improvement of system productivity (along with a reduction in the use of chemical dispersants) without affecting the rate of productivity.

Figure 12:
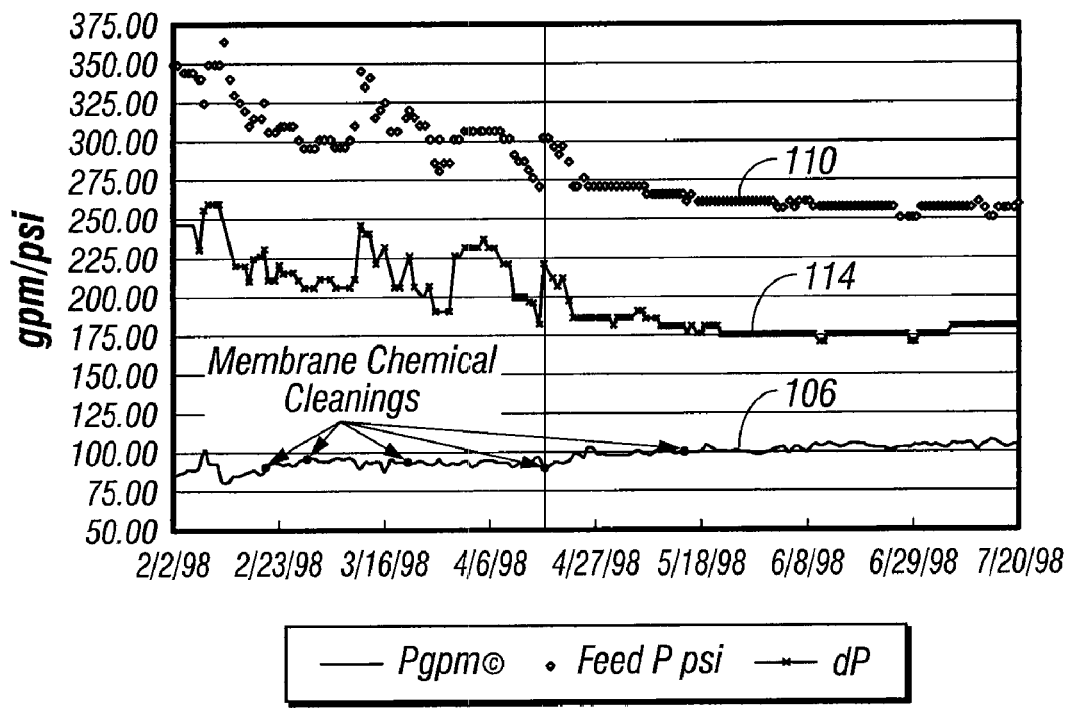
FIG. 12 is a time plot of permeate rate, feed pressure, and transmembrane pressure drop of the first RO unit tested in the experimental run detailed in Example 2.
Figure 13:
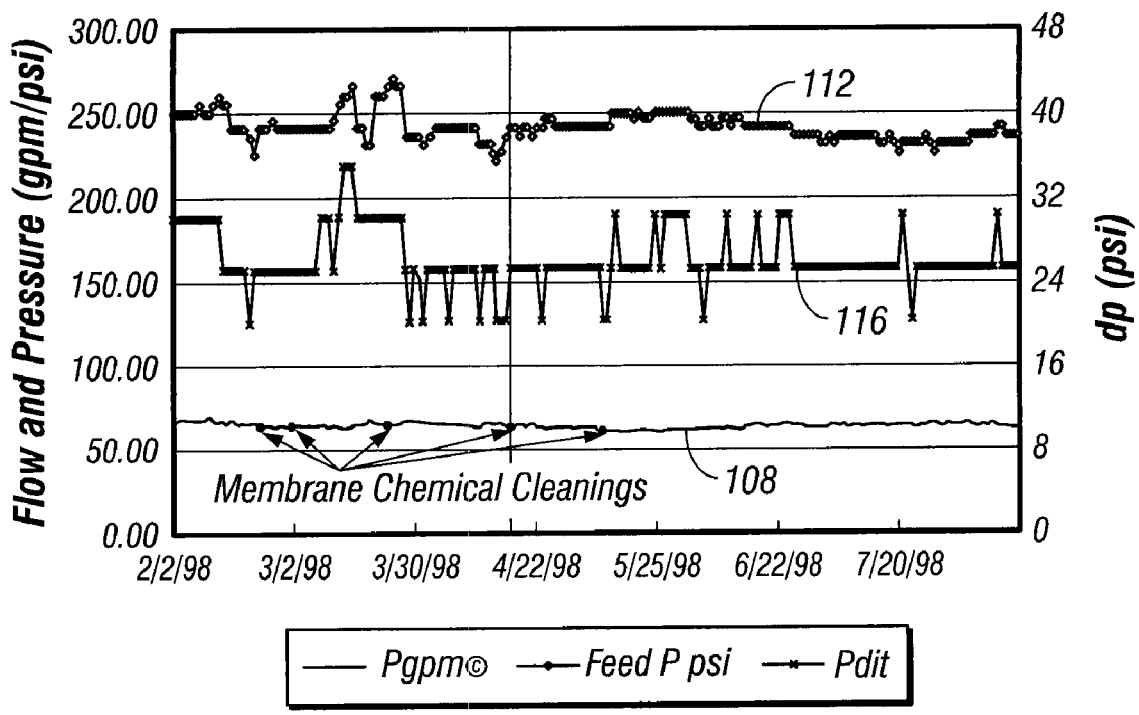
FIG. 13 is a time plot of permeate rate, feed pressure, and transmembrane pressure drop of the second RO unit tested in the experimental run detailed in Example 2.

Examination of historical data at the plant revealed that the frequent cleaning schedule of the membranes had not been effective in reversing the deteriorating performance of the system. Normally, cleaning of membranes had resulted in operation of the system at lower feed pressures and lower transmembrane pressure drops, along with an increase in the permeate flow. As shown in FIGS. 12 and 13, after the test of the invention started, the permeate flow from both units (curves 106 and 108) began an upward trend even as the feed pressure to both systems (curves 110 and 112) was stabilized at a lower level than previously seen. The first RO unit experienced immediate changes after installation of the electrostatic device, including a 7.6% increase in the permeate flow, from 92 gpm average to 99 gpm average (curve 106 in FIG. 12); a 13.6% decrease in the average feed pressure, from 308 psi to 266 psi (curve 110); and a 16.4% decrease in the average pressure differential, from 216 psi to 183 psi (curve 114). Similarly, the second RO unit exhibited a constant decrease in permeate flow at a relatively constant feed pressure prior to the beginning of the test, but productivity began to increase thereafter (curve 108 in FIG. 13). The unit experienced pressure swings (curve 116) associated with the presence of a fouling layer on the membranes, but fouling immediately ceased following the installation of the electrostatic capacitor and inspection showed a reduction of existing deposits within the first three weeks of the test.

Thus, the results from these RO units clearly illustrated the successful prevention of membrane fouling and even the elimination of existing fouling. Both RO units in the system experienced an immediate cessation of fouling following the installation of the device of the invention as a means for pretreatment of the water being purified.

EXAMPLE 3

This test was conducted at a grain refinery where a permeate product for process water makeup was being produced by two independent and identical reverse-osmosis systems with a 5-3-1 configuration operating in parallel. The two RO systems shared the same water source and pretreatment system. The pretreatment consisted of a peroxide/air process to oxidize high contents of hydrogen sulfide in the water, followed by a catalytic carbon bed to remove residual sulfides, and bag filters for final polishing. The first RO unit had new membranes installed prior to the test while the second RO unit continued to operate with fouled membranes.

Figure 14:
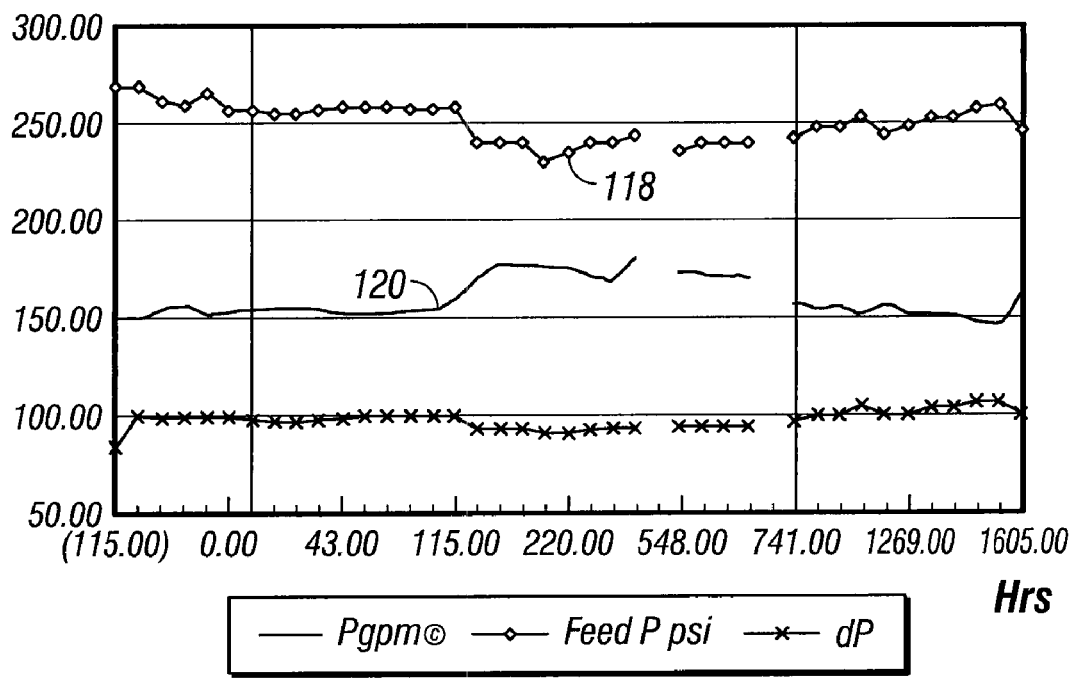
FIG. 14 is a time plot of permeate rate, feed pressure, and transmembrane pressure drop of the first RO unit tested in the experimental run detailed in Example 3.
Figure 15:
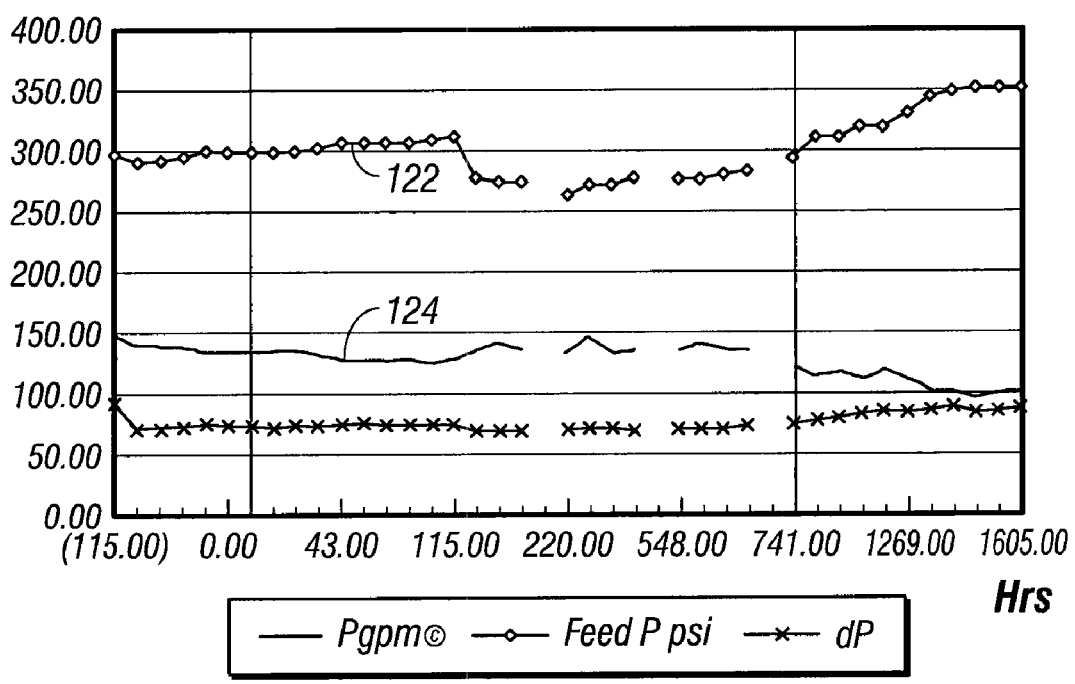
FIG. 15 is a time plot of permeate rate, feed pressure, and transmembrane pressure drop of the second RO unit tested in the experimental run detailed in Example 3.

Fouled membranes on both units had been usually replaced every three months with clean modules, and the fouled modules were being sent out to the manufacturer for cleaning. The high voltage power supply and the electrostatic capacitor of the invention were installed and placed in operation for 27 days at 30,000 volts DC. On the sixth day of operation, the electronic treatment system was shut down for four hours and then restarted to "bump" the system, as this procedure is known in the art, which was found to accelerate cleaning of the membranes. As a result, the permeate increased in both units even after the feed pressure had been reduced significantly. As illustrated in FIG. 14, the feed pressure on the unit with new membranes dropped from an average of 260 psi to an average of 248 psi (curve 118), a reduction of 4.6%, and the permeate rates increased from an average 153 gpm to an average of 163 gpm, an increase of 6.1% (curve 120). As shown in FIG. 15, the feed pressure on the second unit (curve 122), which operated with fouled membranes, was reduced by 10%, bringing the system closer to design operating conditions. Prior to installation of the capacitive electrostatic device, feed pressure to the unit had been over 300 psi, rather than the design operating condition of 250 psi; seven days after the installation, the feed pressure was reduced to 270 psi. Even as feed pressure was being reduced, the permeate flow was increased from an average of 125 gpm to an average of 135 gpm (curve 124).

For verification of the results, the power supply was turned off after 27 days of testing. Both systems, but especially the second RO unit, showed signs of membrane fouling within five days after the capacitor of the invention was turned off. Thirty days after deactivation of the capacitive electrostatic device, the permeate flow in the first unit continued to drop from 160 gpm to 150 gpm (FIG. 14) even as feed pressure to the unit was being increased to 255 psi. After 30 days of operation without the device 10, the second reverse osmosis unit experienced a permeate flow drop to a level below 90 gpm (FIG. 15), even as the feed pressure was being increased to 350 psi. Recovery and salt rejection rates showed a similar trend as those experienced during testing of the other systems. The significant drop in recovery rates for the two reverse-osmosis units after electrostatic treatment was discontinued showed a clear onset of progressive membrane fouling.

The concept of the invention was further investigated in pilot studies to confirm the effect of electrostatic fields on scale build-up in membrane processes. Both once-through and recirculation flow designs were tested with well and surface water supplies. The electrode device 10 described above was utilized for developing an electrostatic field in an electrically grounded process pipe. The results confirmed the ability provided by the invention to inhibit biogrowth on membrane and piping surfaces; to reduce the use of chemicals for scale control; to prevent hard scale formation on membrane surfaces; and to increase reverse-osmosis recovery by using waste water recirculation.

EXAMPLE 4

The facility consisted of a surface-water plant treating water with a hardness of 200 to 300 ppm as calcium carbonate, a TDS of 500 to 600 ppm, and a turbidity of 11 to 25 NTU. The plant included ultrafiltration (UF) membranes and RO membranes. The device 10 of the invention was placed ahead of the UF membranes at a point where it was considered fouled and was operated at 35,000 volts DC. Within twelve hours of operation, the net driving pressure of the system was reduced from 15 psi to approximately 12 psi, and the process ran steadily thereafter for a period of several days with no pressure increases. The application of the capacitive electrostatic field also resulted in the successful control of the formation of hard scale on the RO membranes. Increases in TDS or operating pressure were quickly corrected by implementing a rinse cycle with low pH water (RO water was found to be the best flush water for such cycles). Pressures typically dropped from approximately 220 psi to 110 psi and TDS dropped from 180 ppm to 7 ppm after a rinse cycle.

EXAMPLE 5

At another location, the invention was used for a two-part test in a system that utilized a well water source with 700 to 900 ppm hardness as calcium carbonate and over 1200 ppm TDS. One part of the test involved establishing a steady-state RO operation by controlling membrane fouling so that a periodic flush would return RO performance to its design parameters. This was achieved within 1 day of operation with the electrostatic device of the invention (operated at 35,000 volts DC) in spite of the fact that the system had previously been running continuously, with attendant fouling effects, for a period of 12 weeks.

Another objective of the test was to increase the recovery of the RO unit. Accordingly, concentrate wastewater was passed through a clarifier and flocculation process to reduce its precipitated hardness components and then recirculated to the feed to increase permeate recovery. After flocculation and clarification of the precipitate, the remaining hardness in the concentrate stream was reduced to about 30 to 50 ppm as $CaCO_3$ while the TDS was maintained at about 150 ppm. It is noted that the quality of this water was better than that of the original feed to the RO unit. Thus, it was possible to advantageously recycle the overflow and supernate effluents from the solid separation unit to blend back with the feed of the plant, thereby reducing the hardness of the RO unit feed to about 650 ppm. In addition, disposal requirements were reduced to the solids and sludge produced in the clarifier and the flocculation unit. As a result of the recirculation circuit, the recovery rate of the RO unit was consistently increased to about 95% and the disposal of waste brine to the drain was reduced to about 20% of normal operation during several days of steady operation.

EXAMPLE 6

Another well-water source, having a hardness of 800 ppm as calcium carbonate and a TDS of at least 1300 ppm, was used to test the effects of the capacitive electrostatic device of the invention in an RO membrane separation system. A three-day test was set up with the device 10 operated at 30,000 volts DC. The results showed again the ability to reduce substantially the TDS and hardness of the concentrate stream through clarification and/or flocculation, and to control fouling on the reverse-osmosis membranes without the use of chemical additives.

This example also confirmed that the application of a high-voltage capacitive electrostatic field to a membrane separation system alters the fouling characteristics of the membrane units to the point where a scheduled flush could return their performance to design levels. This complete recovery was very significant because the RO systems utilized for the tests had been running for substantial periods of time. The invention consistently produced a greater than 95% recovery and demonstrated that the use of the electrostatic device 10 prevents biological activity from establishing a biofilm in process equipment, and removes pre-existing scale buildup on membrane surfaces.

It is noted that normal RO-unit concentrates are not suitable for clarification because the solution is typically clear (it does not contain any suspended precipitates), though very high in TDS. Similarly, they are not good candidates for flocculation because the solid content is mostly dissolved, rather than suspended. As a result of the application of a very strong capacitive electrostatic field according to the invention, mineral and organic particles that would normally deposit on the RO membranes remain suspended and end up as visible particles in the concentrate effluent. This cloudy concentrate is very easily clarified and flocculated, especially because of its prior exposure to an electrostatic field, as specifically disclosed in U.S. Pat. No. 5,817,224. Thus, the concentrate stream can be freed of most of its solid content and reused to produce more permeate. At the same time, the solids so removed also include biofilm material and bacteria that would normally adhere to the membranes of the system, thereby improving their performance, maintenance requirements, and durability.

Thus, I found that the use of a capacitive electrostatic unit like the device 10 at high DC voltages in water systems containing deposits of biological origin causes them to disintegrate and to be easily washed away. This effect is believed to result from two distinct phenomena. One is the increase in the surface charge of wetted surfaces, including an increase in the zeta potential of the double layer surrounding each particle, which in turn increases particle repulsion and correspondingly decreases particle agglomeration, scaling, and fouling of membranes. The other phenomenon, most relevant to the discovery of this invention, is the fact that the high-voltage electrostatic field reduces the surface tension of the bulk solution, which in turn promotes the further hydration of biofilms already in place. As a result, biofilms become weakened, swell, and are easily ruptured by turbulence and other mechanical forces acting on them. It is also believed that the bacterial nutrition normally available in the double layer of particles contained in a biofilm becomes unavailable to bacteria in suspension, so that the bacteria do not have the ability to feed and reproduce. Thus starved, the bacteria either die or pass from the system carried away by hydraulic flow.

Figure 16:
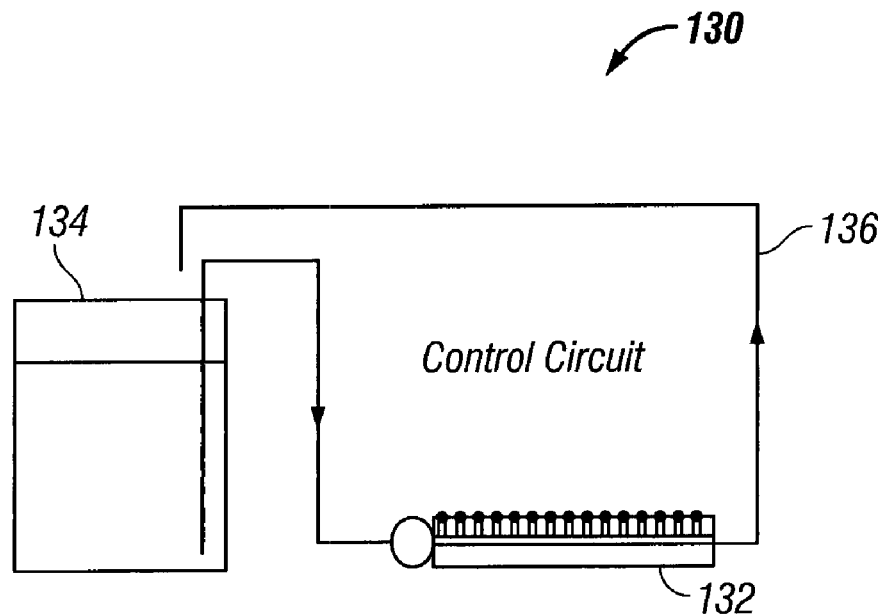
FIG. 16 is a schematic illustration of a conventional laboratory reverse-osmosis unit.
Figure 17:
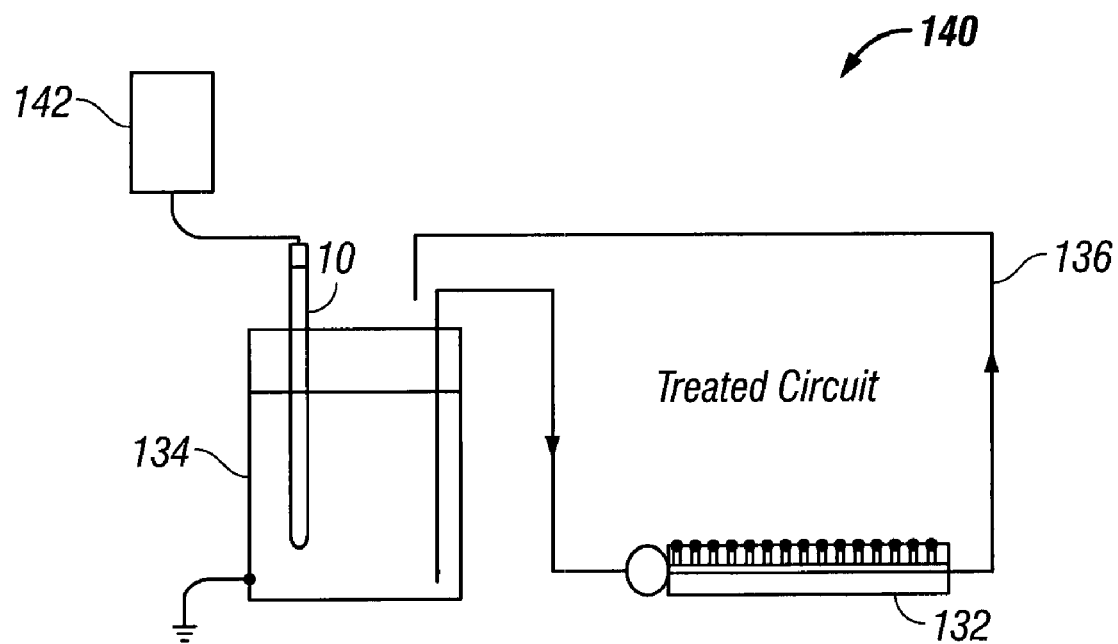
FIG. 17 is a schematic illustration of the conventional laboratory RO unit of FIG. 16 fitted with the capacitive electrostatic generator of the invention.

The foregoing explanation for the mechanism underlying the present invention was further tested in a laboratory experiment using a control membrane unit 130 and a test membrane unit 140, illustrated in FIGS. 16 and 17, respectively. Both figures represent schematically a laboratory reverse-osmosis unit consisting of Robbins devices fitted with cellulose acetate membrane coupons. The unit 130 of FIG. 16, used for control purposes, comprised the Robbins device 132 with a membrane separation element. A nutrient-rich solution was drawn from a metallic water reservoir 134 through the circuit 136 and the Robbins device 132 for treatment through the membrane. Referring to FIG. 17, the system 140 was essentially identical to the system of FIG. 16, but an electrode such as the device 10 described above was inserted into the metallic water reservoir 134. A power supply 142 was used to drive the electrostatic device 10. The reservoir 134 was grounded at 144 in a conventional manner. The system 140 was used for testing the effectiveness of the process of the invention in reducing bacteria accumulation (and correspondingly biofilm formation) in a membrane.

Treatment of the nutrient-rich solution was conducted in both systems 130 and 140 in order to determine whether the electrostatic dispersion effect created by the capacitive device 10 could inhibit biological growth and reduce biofouling of membranes in a nutrient rich environment. To this end, the solution was prepared in bulk with tap water and 0.1 wt % glucose, 1 mg/L of a nitrate salt, and 0.1 mg/L of an ortho-phosphate salt to enhance growth of indigenous bacteria so that testing could be completed over a realistic time period. By design, this solution was prepared so as to produce an unrealistically high bacterial count, as never found in real-world water treatment facilities (after 48 hours, the bacteria population had advanced to levels characteristic of sewage treatment population). The electrostatic device 10 was powered by a 30 kV DC power supply, and the flow through each Robbins device circuit was circulated at a rate of 3 to 4 ml/min with samples of tap water being put in place approximately every 48 hours to prevent the expiration of the test population of bacteria. Viable-bacteria plate counts were performed every 48 hours on the new tap water sample and on the old sample that was being removed. Plugs with membrane coupons were removed after 24 hours, 48 hours, and 7 days of testing. At each of these times, coupons were tested in triplicate from the control and the test units. In addition, at time zero, one coupon was tested for a background count. These tests consisted of viable-bacteria plate counts performed by gentle washing of the membrane surface with a sterile saline solution, vigorously vortexing the membrane coupon in the sterile saline solution with sterile glass beads, and performing viable-bacteria plate counts. All plate counts were performed using the spread plate method on R2A Agar and incubation at 27° C. for five to seven days. Specific bacteria were not identified.

The results of these tests showed that the membrane coupons in the test circuit 140 had significantly less biofilm on the surface than the control coupons after 24 hours. After 48 hours and after 7 days, no significant differences existed between the control and the test coupons. In these latest samples, there was also no significant difference in the number of bacteria in the two reservoirs, which was expected in view of the extremely high count artificially created in the feed solution. Thus, the results obtained from the experimental apparatus of FIGS. 16 and 17 confirmed the effects of high-voltage electrostatic fields seen in industrial water systems, even with very high bacterial population. This demonstrates that capacitive electrostatic treatment according to the present invention is effective as a biofilm control measure.

Referring to the general flow diagram of FIG. 9, it is noted that several experimental runs were conducted at greater than 80% recirculation of the concentrate stream. As a result, the RO units were able to reach recovery rates greater that 95% and sustain them for extended periods of time. Comparable results have not been possible before in the art.

Several additional runs were performed at different voltages to test the effectiveness of the treatment. These experiments showed that the ability of the capacitive electrostatic generator of the invention to inhibit biofouling diminished markedly with the DC voltage applied to the capacitor. No apparent results were experienced at voltages below 10,000 volts. Depending on the quality of the water tested, some results were observed at 10,000 volts and above, with noticeably increasing efficacy at greater voltages. Considering the tradeoffs between safety, equipment cost, maintenance and life, and process performance, the preferred voltage of operation for most systems has been found to be about 30,000 DC volts and above.

Various changes in the details, steps and materials which have been described may be made by those skilled in the art within the principles and scope of the invention herein illustrated and defined in the appended claims. For example, I found that the exact placement of the capacitive electrostatic device of the invention in the body of water undergoing treatment is not crucial so long as the resulting field reaches across the separation membranes. Thus, it is possible to achieve substantially the same results if the device is placed closely downstream of the membranes.

It is also important to note that the discovery of this invention lies in the realization that high-voltage capacitive electrostatic fields disrupt the growth and produce the elimination of biofilms from a carrying liquid, and most importantly also from substrates upon which they tend to adhere. Therefore, the invention should not be regarded as useful or applicable only to membrane separation systems, although these systems have been used and described here to demonstrate its viability. Similarly, it is clear that the invention is not limited to the capacitive electrostatic device described herein, but any capacitor capable of withstanding the high DC voltages required to inhibit biofilm formation would be suitable to practice the invention.

Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and methods.

What is claimed is:

1. A method for reducing existing biofilm deposits on a wall in a water system comprising the steps of:

providing a capacitive electrostatic generator adapted to create an electrostatic field;

immersing said electrostatic generator in a body of water in the water system, the water system being connected to an electrical ground relative to an electromotive force available for energizing the electrostatic generator; and reducing said existing biofilm deposits by energizing said electrostatic generator with said electromotive force, such that a corresponding electrostatic field is created between said generator immersed in the water system and said electrical ground without measurable current leakage in the body of water;

wherein said capacitive electrostatic generator comprises a vitrified ceramic tube of unibody construction having an integrally-sealed end defining an inner cavity with an inner wall; conductive material contained within said inner cavity and disposed in intimate contact with said inner wall; electrically-insulated sealing means for providing hermetic closure to said inner cavity; and electrical means for energizing said conductive material with a static electromotive force.

2. The method of claim 1, wherein said voltage is greater than about 10,000 volts DC.

3. The method of claim 1, wherein said voltage is greater than about 30,000 volts DC.

* * * * *